US012505305B2

(12) United States Patent
Olabiyi et al.

(10) Patent No.: US 12,505,305 B2
(45) Date of Patent: Dec. 23, 2025

(54) ADVERSARIAL BOOTSTRAPPING FOR MULTI-TURN DIALOGUE MODEL TRAINING (71) Applicant: Capital One Services, LLC, McLean, VA (US)

(72) Inventors: Oluwatobi Olabiyi, Falls Church, VA (US); Erik T. Mueller, Chevy Chase, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/234,623

(22) Filed: Aug. 16, 2023

(65) Prior Publication Data

US 2023/0394245 A1 Dec. 7, 2023

Related U.S. Application Data (63) Continuation of application No. 16/880,455, filed on May 21, 2020, now Pat. No. 11,775,770.
(Continued)

(51) Int. Cl.
*G06F 40/35* (2020.01)
*G06F 18/214* (2023.01)
(Continued)

(52) U.S. Cl.
CPC .......... *G06F 40/35* (2020.01); *G06F 18/2155* (2023.01); *G06F 18/2415* (2023.01);
(Continued)

(58) Field of Classification Search
CPC .................. G10L 15/063; G10L 15/16; G10L 2015/0638; G06K 9/6259; G06K 9/6277; G06N 3/049
See application file for complete search history.

(56) References Cited

U.S. PATENT DOCUMENTS 10,108,608 B2 * 10/2018 Williams ................ G06F 40/58
11,049,500 B2    6/2021 Olabiyi et al.
(Continued)

FOREIGN PATENT DOCUMENTS

WO       2014205231 A1    12/2014

OTHER PUBLICATIONS

Tengyuan Liang, How Well Can Generative Networks Learn Densities: Nonparametric View, arXiv:1712.08244v2 [stat.ML] Feb. 16, 2018.
(Continued)

*Primary Examiner* — Bhavesh M Mehta
*Assistant Examiner* — Edward Tracy, Jr.
(74) *Attorney, Agent, or Firm* — Banner & Witcoff, Ltd.

(57) ABSTRACT

Systems described herein may use machine classifiers to perform a variety of natural language understanding tasks including, but not limited to multi-turn dialogue generation. Machine classifiers in accordance with aspects of the disclosure may model multi-turn dialogue as a one-to-many prediction task. The machine classifier may be trained using adversarial bootstrapping between a generator and a discriminator with multi-turn capabilities. The machine classifiers may be trained in both auto-regressive and traditional teacher-forcing modes, with the maximum likelihood loss of the auto-regressive outputs being weighted by the score from a metric-based discriminator model. The discriminators input may include a mixture of ground truth labels, the teacher-forcing outputs of the generator, and/or negative examples from the dataset. This mixture of input may allow for richer feedback on the autoregressive outputs of the generator. Additionally, dual sampling may improve response relevance and coherence by overcoming the problem of exposure bias.

20 Claims, 6 Drawing Sheets

Related U.S. Application Data (60) Provisional application No. 62/851,956, filed on May 23, 2019.

(51) Int. Cl.

| | |
|---|---|
| *G06F 18/2415* | (2023.01) |
| *G06N 3/049* | (2023.01) |
| *G10L 15/06* | (2013.01) |
| *G10L 15/16* | (2006.01) |

(52) U.S. Cl.
CPC ............ *G06N 3/049* (2013.01); *G10L 15/063* (2013.01); *G10L 15/16* (2013.01); *G10L 2015/0638* (2013.01)

(56) References Cited

U.S. PATENT DOCUMENTS

| | | | |
|---|---|---|---|
| 11,355,125 B2* | 6/2022 | Carbune | ................. G10L 17/26 |
| 2013/0138436 A1 | 5/2013 | Yu et al. | |
| 2014/0067738 A1 | 3/2014 | Kingsbury | |
| 2015/0055855 A1* | 2/2015 | Rodriguez | ........... G06V 10/245 |
| | | | 382/155 |
| 2015/0254555 A1 | 9/2015 | Williams, Jr. et al. | |
| 2016/0019459 A1 | 1/2016 | Audhkhasi et al. | |
| 2016/0093048 A1 | 3/2016 | Cheng et al. | |
| 2018/0121415 A1* | 5/2018 | Perez | .................... G06F 16/367 |
| 2019/0130903 A1* | 5/2019 | Sriram | .................. G10L 15/063 |
| 2019/0371299 A1* | 12/2019 | Jiang | ..................... G10L 15/197 |
| 2019/0385019 A1 | 12/2019 | Bazrafkan et al. | |
| 2020/0026959 A1* | 1/2020 | Lee | ....................... G06F 18/214 |
| 2020/0027442 A1 | 1/2020 | Mathur et al. | |
| 2020/0098353 A1 | 3/2020 | Olabiyi et al. | |
| 2020/0152184 A1* | 5/2020 | Steedman Henderson | ................... |
| | | | G10L 15/1822 |
| 2021/0217408 A1* | 7/2021 | Hakkani-Tur | ........... G06N 3/02 |
| 2022/0126864 A1 | 4/2022 | Moustafa et al. | |

OTHER PUBLICATIONS

Wenbin Li et al, Online Deep Metric Learning, arXiv:1805.05510v1 [cs.CV] May 15, 2018.
David Berthelot et al, Understanding and Improving Interpolation in Autoencoders via an Adversarial Regularizer, arXiv:1807.07543v2 [cs.LG] Jul. 23, 2018.
Sutskever, I., O. Vinyals, Q. Le, Sequence to sequence learning with neural networks, Proceedings of Advances in Neural Information Processing Systems (NIPS), pp. 3104-3112, 2014.
Vinyals, O., Q. Le, A neural conversational model, Proceedings of ICML Deep Learning Workshop, 2015.
Li, J., M. Galley, C. Brockett, et al, A diversity-promoting objective function for neural conversation models, Proceedings of NAACL-HLT, 2016.
Serban, I., A. Sordoni, Y. Bengio, et al, Building end-to-end dialogue systems using generative hierarchical neural network models, Proceedings of the Thirtieth AAAI Conference on Artificial Intelligence (AAAI 2016), pp. 3776-3784, 2016.
Xing, C., W. Wu, Y. Wu, et al, Hierarchical recurrent attention network for response generation, arXiv preprint arXiv:1701.07149, 2017.
Serban, I. V., A. Sordoni, R. Lowe, et al, A hierarchical latent variable encoder-decoder model for generating dialogue, Proceedings of the Thirty-first AAAI Conference on Artificial Intelligence (AAAI 2017), 2017.
Serban, I. V., T. Klinger, G. Tesauro, et al, Multiresolution recurrent neural networks: An application to dialogue response generation, Proceedings of the Thirty-first AAAI Conference on Artificial Intelligence (AAAI 2017), 2017.
Yu, L., W. Zhang, J. Wang, et al, Seqgan: sequence generative adversarial nets with policy gradient, Proceedings of the Thirty-first AAAI Conference on Artificial Intelligence (AAAI 2017), 2017.
Li, J., W. Monroe, T. Shi, et al. Adversarial learning for neural dialogue generation, arXiv preprint arXiv:1701.06547, 2017.
Che, T., Y. Li, R. Zhang, et al, Maximum-likelihood augmented discrete generative adversarial networks, arXiv preprint arXiv:1702.07983, 2017.
Zhang, Y., Z. Gan, K. Fan, et al. Adversarial feature matching for text generation, arXiv preprint arXiv:1706.03850, 2017.
Xu, Z., B. Liu, B. Wang, et al, Neural response generation via gan with an approximate embedding layer, EMNLP, 2017.
Zhang, Y., M. Galley, J. Gao, et al, Generating informative and diverse conversational responses via adversarial information maximization, NeurIPS, 2018.
Nakamura, R., K. Sudoh, K. Yoshino, et al, Another diversity-promoting objective function for neural dialogue generation, AAAI Workshop on Reasoning and Learning for Human-Machine Dialogues (DEEP-DIAL), 2019.
Zhang, S., E. Dinan, J. Urbanek, et al, Personalizing dialogue agents: I have a dog, do you have pets too?, arXiv preprint arXiv:1801.07243v3, 2018.
Olabiyi, O., A. Salimov, A. Khazane, et al, Multi-turn dialogue response generation in an adversarial learning framework, arXiv preprint arXiv:1805.11752, 2018.
Olabiyi, O., A. Khazan, E. Mueller, An adversarial learning framework for a persona-based multi-turn dialogue model, 17th IEEE International Conference on Machine Learning and Applications (ICMLA), 2018.
Olabiyi, O., A. Khazan, A. Salimov, et al, An adversarial learning framework for a persona-based multi-turn dialogue model, NAACL NeuralGen Workshop, 2019.
Banchs, R. E., Movie-dic: A movie dialogue corpus for research and development, Proceedings of the 50th Annual Meeting of the Association for Computational Linguistics, pp. 203-207, 2012.
Shao, L., S. Gouws, D. Britz, et al, Generating long and diverse responses with neural conversational models, Proceedings of International Conference of Learning Representation (ICLR), 2017.
Williams, R. J., D. Zipser, A learning algorithm for continually running fully recurrent neural networks, Neural Computation, 1(2):270-280, 1989.
Lowe, R., N. Pow, I. Serban, et al, The ubuntu dialogue corpus: A large dataset for research in unstructured multi-turn dialogue systems, SIGDIAL, 2015.
Lamb, A., A. Goyah, Y. Zhang, et al, Professor forcing: A new algorithm for training recurrent networks, Proceedings of Advances in Neural Information Processing Systems (NIPS 2016), 2016.
Bengio, S., O. Vinyals, N. Jaitly, et al, Scheduled sampling for sequence prediction with recurrent neural networks, Proceedings of Advances in Neural Information Processing Systems (NIPS 2015), 2015.
Bai, Y., S. Goldman, L. Zhang, Tapas: Two-pass approximate adaptive sampling for softmax, arXiv preprint arXiv:1707.03073, 2017.
Reed, S., H. Lee, D. Anguelov, et al, Training deep neural networks on noisy labels with bootstrapping, ICLR, 2015.
Grandvalet, Y., Y. Bengio, Semi-supervised learning by entropy minimization, NIPS, pp. 529-536, 2005.
Grandvalet, Y., Y. Bengio, Entropy Regularization, chapter 9 "Semi-Supervised Learning" by Chappelle, O., Scholkopf B. and Zien A, mitpress: 10.7551/mitpress/9780262033589.003.0009, 2006.
Goodfellow, I. J., J. Pouget-Abadie, M. Mirza, et al, Generative adversarial nets, Proceedings of Advances in Neural Information Processing Systems (NIPS 2014), 2014.
Isola, P., J. Y. Zhu, T. Zhou, et al, Image-to-image translation with conditional adversarial networks, Conference on Computer Vision and Pattern Recognition (CVPR, 2017), 2017.
Glynn, P. W., Likelihood ratio gradient estimation for stochastic systems, Communications of the ACM, 33(10):75-84, 1990.
Williams, R. J., Simple statistical gradient following algorithms for connectionist reinforcement learning, Machine Learning, 8(3-4):229-256, 1992.
Silver, D., G. Lever, N. Heess, et al, Deterministic policy gradient algorithms., ICML, 2014.

(56) References Cited

OTHER PUBLICATIONS

Radford, A., J. Wu, R. Child, et al, Language models are unsupervised multitask learners, https://d4mucfpksywv.cloudfront.net/better-language-models, 2019.
Graves, A., G.Wayne, I. Danihelka, Neural turing machines, arXiv preprint arXiv:1410.5401, 2014.
Graves, A., G. Wayne, M. Reynolds, et al, Hybrid computing using a neural network with dynamic external memory, Nature Online, 538:471-476, 2016.
Bahdanau, D., K. Cho, Y. Bengio. Neural machine translation by jointly learning to align and translate, Proceedings of International Conference of Learning Representation (ICLR 2015), 2015.
Luong, M. T., I. Sutskever, Q. V. Le, et al, Addressing the rare word problem in neural machine translation, Proceedings of the 53rd Annual Meeting of the Association for Computational Linguistics, 2015.
Vaswani, A., N. Shazeer, N. Parmar, et al, Attention is all you need, NIPS, 2017.
Glorot, X., Y. Bengio, Understanding the difficulty of training deep feedforward neural networks, International conference on artificial intelligence and statistics, 2010.
Jean, S., K. Cho, R. Memisevic, et al, On using very large target vocabulary for neural machine translation, arXiv preprint arXiv:1412.2007, 2015.
Papineni, K., S. Roukos, T. Ward, et al, Bleu: A method for automatic evalution of machine translation, Proceedings of the 40th Annual Meeting of the Association for Computational Linguistics, pp. 311-318, 2002.
Lin, C. Y., Rouge: a package for automatic evaluation of summaries, Proceedings of the Workshop on Text Summarization Branches Out, 2014.

\* cited by examiner

ADVERSARIAL BOOTSTRAPPING FOR MULTI-TURN DIALOGUE MODEL TRAINING

CROSS-REFERENCE TO RELATED APPLICATIONS

The instant application claims priority to and is a continuation of U.S. patent application Ser. No. 16/880,455, titled "Adversarial Bootstrapping for Multi-Turn Dialog Model Training," and filed on May 21, 2020, and claims priority to U.S. Provisional Patent Application No. 62/851,956, titled "Adversarial Bootstrapping for Multi-Turn Dialog Model Training" and filed May 23, 2019, the disclosure of which is hereby incorporated by reference in its entirety.

TECHNICAL FIELD

The present disclosure is generally related to the generation of automated responses to user input.

BACKGROUND

Computer generated responses to user input such as dialogue, images, and the like, are often limited in diversity and/or not particularly relevant to the user input. For example, computer generated responses to user input such as dialogue in conventional systems may include phrases such as "I don't know," "I'm sorry," and "I don't know what you are talking about," that are safe, limited in diversity, and not particularly relevant to the topic of the conversation.

While advances in machine learning, especially within deep neural networks, have enabled new capacity for machines to learn behavior from repository human behavioral data, existing neural network architecture and/or methodology continue to produce computer generated responses to user input that are limited in diversity and/or not particularly relevant to the topic of the input data. Aspects described herein may address these and other problems, and generally improve the quality and capabilities of machine classifiers trained to perform classification tasks.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems described herein may use machine classifiers to perform a variety of natural language understanding tasks including, but not limited to multi-turn dialogue generation. Existing open domain neural dialogue models are known to produce responses that lack relevance, diversity, and in many cases coherence. These shortcomings stem from the limited ability of common training objectives to directly express these properties as well as their interplay with training datasets and model architectures. In a variety of embodiments, machine classifiers may model multi-turn dialogue as a one-to-many prediction task. The machine classifier may be trained using adversarial bootstrapping between a generator and a discriminator with multi-turn capabilities. The machine classifiers may be trained in both auto-regressive and traditional teacher-forcing modes, with the maximum likelihood loss of the auto-regressive outputs being weighted by the score from a metric-based discriminator model. The discriminator input may include a mixture of ground truth labels, the teacher-forcing outputs of the generator, and/or negative examples from the dataset. This mixture of input data may allow for richer feedback on the autoregressive outputs of the generator. Additionally, dual sampling may improve response relevance and coherence by overcoming the problem of exposure bias such as, but not limited to, behavioral differences between teacher-forcing training and autoregressive inference. Several strategies may be used for sampling the generator's autoregressive outputs during training to encourage diversity without sacrificing relevance.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for training machine classifiers using adversarial bootstrapping techniques. These machine classifiers may be used to generate data based on a variety of input data, such as multi-turn dialogue responses. Conventional systems for generating responses in multi-turn dialogues often produce irrelevant or non-useful responses to user input due in part to the criterion for the training and application stages being different and generated responses tend to be either generic, out-of-context, or disproportionately short. For example, conventional dialogue generation models may be trained with teacher forcing methods where during training, the generator generates the next word in the response by taking the past word from an actual human response (e.g. past input) rather than the past output of the generator. However, during the application stage, the generator may produce irrelevant responses to the user input because it is only able to use its own past input. This discrepancy between training and inference is known as exposure bias and significantly limits the informativeness of the responses as the decoding error compounds rapidly during inference. To address exposure bias, conventional systems typically use a scheduled sampling technique where the machine learning module is encouraged to use its own past output word as the basis to generate new responses. However, this may easily lead to instabilities. Additionally, conventional systems may also produce responses to user input that are limited in diversity because diversity is often not encouraged during the training stage but expected during the application stage. To address diversity, conventional systems may apply heuristic techniques to the output of a machine learning module. However, this typically does not provide the same quality and quantity of diversity as introducing diversity during the training stage. Additionally, some conventional systems address diversity by using maximum mutual information criteria; however, this still provides limited diversity in generated outputs.

Human conversations contain a large number of generic, uninformative responses, giving rise to word-level syntactic and utterance-level semantic redundancy. The syntactic redundancy is evident from a nonuniform sequence entropy profile, that is concave with respect to token position, with the tokens at the beginning and end of a sequence having lower entropy than those in the middle. This initial positive energy gradient may create learning barriers leading to a poor calibration of the model's output distribution, and is a major contributing factor to the short, generic outputs in existing dialogue models. Earlier conversation models including single-turn sequence-to-sequence architectures typically fail to capture long-term temporal dependencies across conversation turns. Such models tend to fail in multi-turn scenarios, generating repetitive responses that are dull and generic. Existing dialogue models typically learn the conditional distribution of the response given the context (either single- or multi-turn), from the maximum likelihood estimation. Due to the redundant nature of dialogue data and the greedy nature of maximum likelihood estimation, the model usually learns just a simple mapping between the context and response, which yields generic responses. Further, the use of maximum likelihood estimate exacerbates one-to-many and class-imbalance problems in generating responses in multi-turn dialogue tasks, leading to uninteresting and generic responses.

Systems and methods described herein may use machine classifiers to perform a variety of natural language understanding tasks including, but not limited to multi-turn dialogue generation. Machine classifiers in accordance with aspects of the disclosure may model multi-turn dialogue as a one-to-many prediction task. The machine classifier may be trained using adversarial bootstrapping between a generator and a discriminator with multi-turn capabilities. The machine classifiers may be trained in both auto-regressive and traditional teacher-forcing modes, with the maximum likelihood loss of the auto-regressive outputs being weighted by the score from a metric-based discriminator model. The discriminators input may include a mixture of ground truth labels, the teacher-forcing outputs of the generator, and/or negative examples from the dataset. This mixture of input may allow for richer feedback on the autoregressive outputs of the generator. Additionally, dual sampling may improve response relevance and coherence by overcoming the problem of exposure bias.

Operating Environments and Computing Devices

Figure 1:
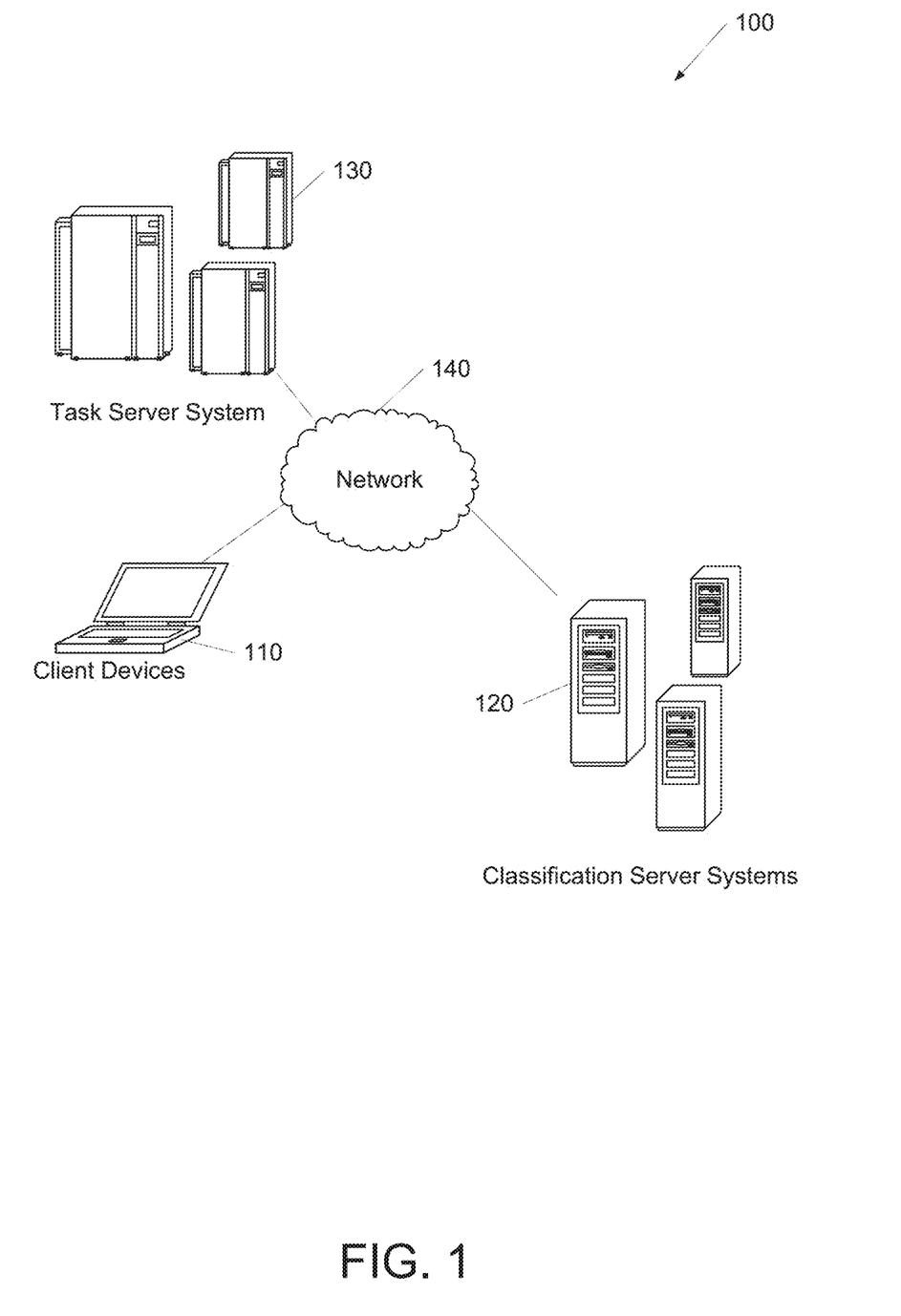
FIG. 1 shows an example of an operating environment in which one or more aspects described herein may be implemented.

FIG. 1 shows an operating environment 100. The operating environment 100 may include at least one client device 110, at least one task server system 130, and/or at least one classification server system 120 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Client devices 110 may provide data and/or interact with a variety of machine classifiers as described herein. Classification server systems 120 may store, train, and/or provide a variety of machine classifiers as described herein. Task server systems 130 may exchange data with client devices 110, provide training data to the classification server systems 120, provide input data to the classification server systems 120 for classification, and/or obtain classified data from the classification server systems 120 as described herein. However, it should be noted that any computing device in the operating environment 100 may perform any of the processes and/or store any data as described herein. The task server systems 130 and/or classification server systems 120 may be publicly accessible and/or have restricted access. Access to a particular server system may be limited to particular client devices 110. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 140 may include a local area network (LAN), a wide area network (WAN), a wireless telecommunications network, and/or any other communication network or combination thereof.

The data transferred to and from various computing devices in operating environment 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the operating environment 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the operating environment 100 in front of one or more computing devices such that any external devices may communicate directly with the specialized hardware.

Figure 2:
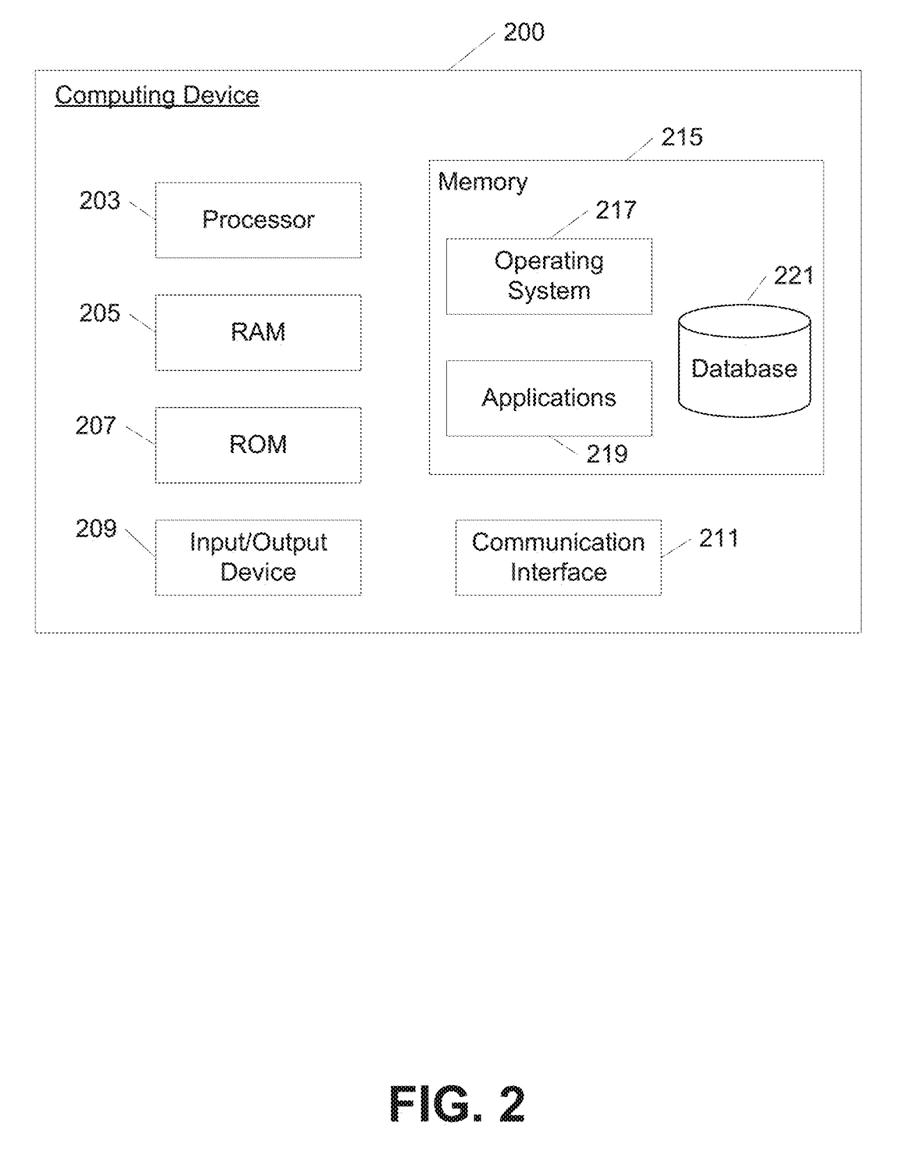
FIG. 2 shows an example computing device in accordance with one or more aspects described herein.

Turning now to FIG. 2, a conceptual illustration of a computing device 200 that may be used to perform any of the techniques as described herein is shown. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Any data described and/or transmitted herein may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 200. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 200 in front of one or more computing devices such that any external devices may communicate directly with the specialized hardware.

Machine Classifiers and Processes

Machine classifiers in accordance with aspects of the invention employ adversarial bootstrapping to improve dialogue generation, particularly in multi-turn dialogue tasks. In several embodiments, the machine classifier includes a generator and a discriminator. The discriminator may be trained using a variety of data, including negative samples based on the generator's deterministic teacher forcing output and unrelated dialogue samples from the training set. This makes the discriminator's task more challenging and improve the quality of the feedback to the generator by discouraging the generation of high frequency generic responses. In several embodiments, the training samples used are taken from the top k (where k is an arbitrary number) generator outputs and/or the maximum a posterior probability output with Gaussian noise as additional inputs. This allows the machine classifier to be trained based on plausible trajectories during training, particularly as compared to existing machine classifiers where the discriminator mostly score the generated samples very low. The top k sampling strategy also mitigates the gradient variance problem found in typical machine classifiers. Machine classifiers in accordance with aspects of the disclosure may be trained using both a maximum likelihood objective from the generator along with a metric learning objective from the discriminator.

The machine classifier may be trained to generate candidate responses based on a variety of criteria such as, but not limited to, a context, conversation history, and the like. In a variety of embodiments, a context $x_i$ may be represented as $$X_i = (x_1, x_2, \ldots, x_i)$$

up to turn i, with $x_{i+1}$ being the target response for $x_i$. Based on target input samples $(x_i, x_{i+1})$, a generative model $p_{\theta_G}(y_i|x)$ may be used to score representative hypothesis $y_i$ given arbitrary dialogue contexts $x_i$ such that responses that are indistinguishable from informative and diverse target responses are favored with high scores and otherwise given low scores, where $\theta_G$ is the parameters for the generator G. The collection of possible responses at turn i may be expressed as $$y_i = (y_i^1, y_i^2, \ldots, y_i^{T_i})$$

With $T_i$ being the length of the i-th candidate response $y_i$ and $y_i^t$ is the t-th word of that response.

The machine classifier may adversarially train the generator and/or discriminator to generate output data for a variety of tasks, such as multi-turn dialogue models. In several embodiments, the machine classifier may be trained based on the objective $$\mathcal{L}_{AB}(\theta_G) = -\sum_{y_i \in y_i} t_G(y_i) \log p_{\theta_G}(y_i | x_i)$$

where $L_{AB}$ is the adversarial bootstrapping objective, and $t_G$ is the target variable that controls the generator training. In a variety of embodiments, particularly those using hard bootstrapping, $t_G$ may be defined, for hyperparameter $\beta$, with the piecewise equation:

$$t_G(y_i) = \beta_{[y_i = x_{i+1}]}, \; t_G(y_i) = 1 - \beta_{[y_i = \arg\max_{y_i} p_{\theta_G}(y_i|x_i)]}$$

and 0 otherwise. In several embodiments, particularly those using a maximum likelihood estimation, $t_G$ may be defined using the piecewise equation:

$$t_G(y_i) = 1_{[y_i = x_{i+1}]}$$

and 0 otherwise. In many embodiments, the generator target is defined using the piecewise equation:

$$t_G(y_i) = \begin{cases} \beta & y_i = x_{i+1} \\ 0 & y_i = \arg\max_{y_i} p_{\theta_G}(y_i | x_i) \\ \alpha Q_{\theta_D}(y_i, x_i) & \text{otherwise} \end{cases}$$

for hyperparameter $\alpha$ and $$Q_{\theta_D}(y_i, x_i) \in [0,1]$$

being the bootstrapped target obtained from a discriminator D with parameters $\theta_D$. The generator output and/or ground truth training labels may be used in training the discriminator in addition to any human-generated negative samples, $\bar{x}_{i+1}$ in the input data. The inclusion of human-generated negative samples encourages the discriminator to assign low scores to high frequency, generic target responses in the dataset, thereby discouraging the generator from producing them.

The objective function may include the term $$t_D(y_i) = \begin{cases} \beta & y_i = x_{i+1} \\ 0 & y_i = \arg\max_{y_i} p_{\theta_G}(y_i | x_i) \\ 0 & y_i = \bar{x}_{i+1} \end{cases}$$

and the discriminator objective may include the cross-entropy between the output and the target of the discriminator given by $$\mathcal{L}_{AB}(\theta_D) = -\sum_{y_i \in Y_i} \left[ t_D(y_i) \log Q_{\theta_D}(y_i, x_i) + (1 - t_D(y_i)) \log(1 - Q_{\theta_D}(y_i, x_i)) \right]$$

To backpropagate the learning signal for the case where $$t_G(y_i) = \alpha Q_{\theta_D}(y_i, x_i)$$

both stochastic and/or deterministic gradient methods may be used, where a is a hyperparameter. For stochastic gradient methods, the gradient of $$L_{AB}(\theta_G) \; w.r.t. \; \theta_G$$

may be approximated based on Monte Carlo samples such as, for Euclidian space $\mathbb{E}$, $$\nabla_{\theta_G} L_{AB}(\theta_G) \approx \mathbb{E}_{p_{\theta_G}(y_i|x_i)} Q_{\theta_D}(y_i, x_i) \cdot \nabla_{\theta_G} \log p_{\theta_G}(y_i | x_i)$$

For deterministic gradient methods, the gradient may be approximated by $$\nabla_{\theta_G} \mathcal{L}_{AB}(\theta_G) \approx \mathbb{E}_{p(z_i)} \nabla_{y_{max}} Q_{\theta_D}(y_{max}, x_i) \cdot \nabla_{\theta_G} \log p_{\theta_G}(y_{max} \mid x_i, z_i)$$

where $$y_{max} = \operatorname{argmax} p_{\theta_G}(y_i \mid x_i, z_i)$$

and $$z_i \sim \mathcal{N}_i(0, I)$$

is a source of randomness.

In a number of embodiments, the top k generator outputs may be sampled for training and/or autoregression purposes. The top k outputs may be sampled based on a categorical distribution based on the output logits and/or a uniform distribution of generator outputs.

Figure 3A:
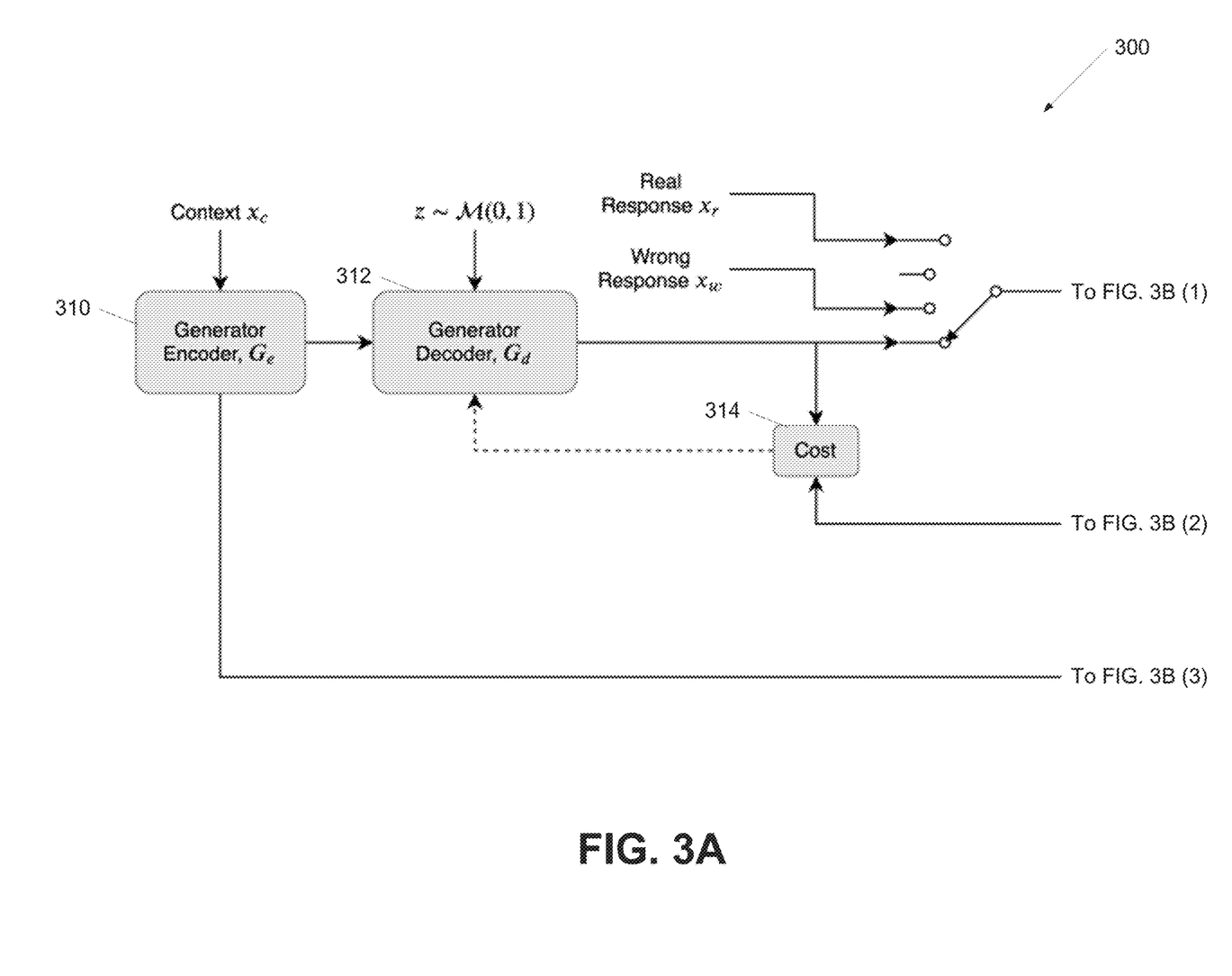
FIGS. 3A-B show an example of a machine classifier in accordance with one or more aspects described herein.
Figure 3B:
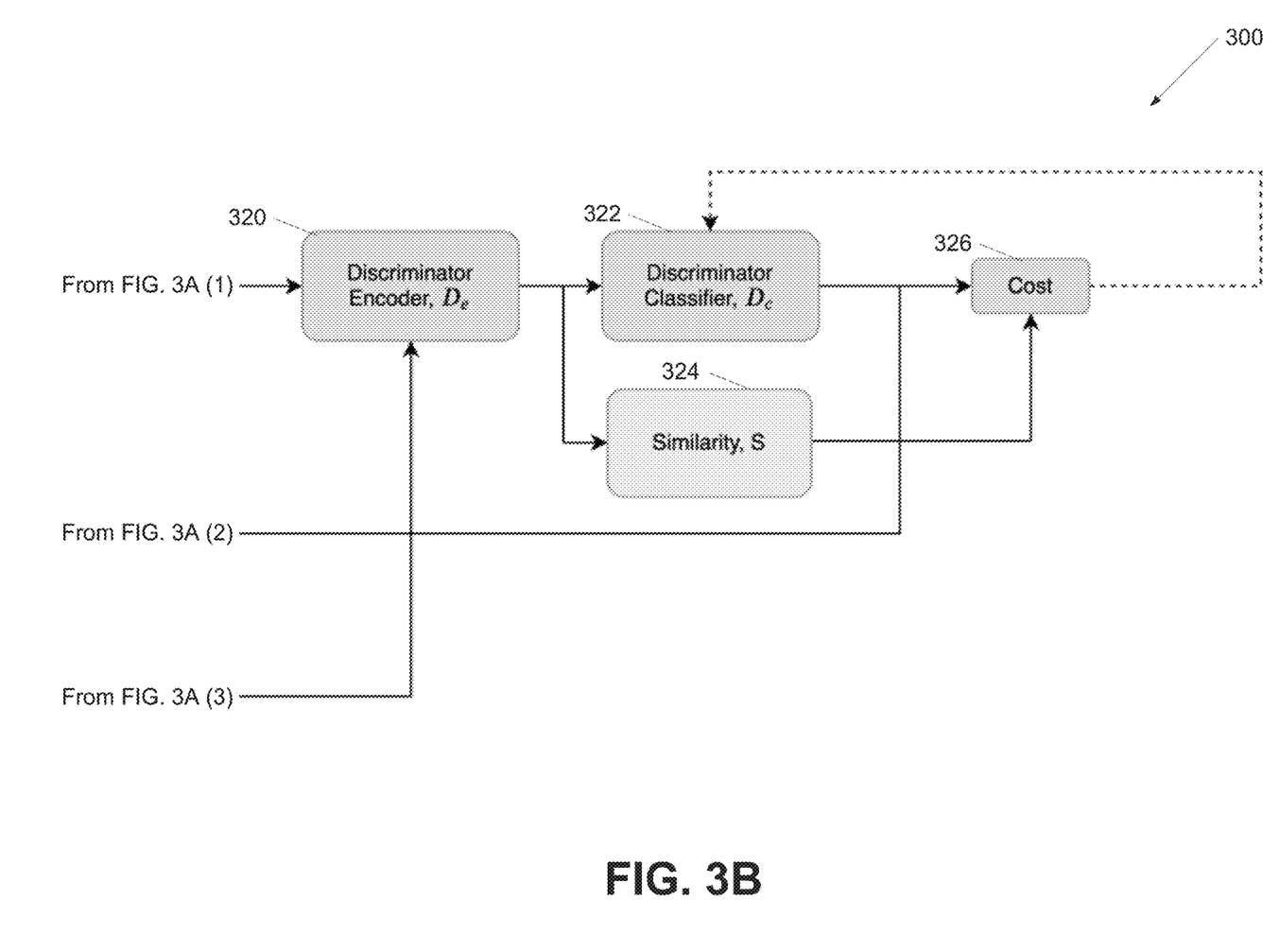

FIGS. 3A-B show an example of a machine classifier in accordance with one or more aspects described herein. The machine classifier 300 may include a generator and a discriminator. As shown in FIG. 3A, the generator may include a generator encoder 310, a generator decoder 312, and a generator cost function 314.

The generator encoder 310 may encode input data, such as a context, conversation history, or the like. In a variety of embodiments, the generator and discriminator both use the generator encoder 310. In several embodiments, the generator and discriminator use separate encoders. The generator encoder 310 may utilize any of a variety of machine learning models, including (but not limited to) decision trees, k-nearest neighbors, support vector machines (SVM), neural networks (NN), recurrent neural networks (RNN), convolutional neural networks (CNN), and/or probabilistic neural networks (PNN). RNNs may further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine learning models may be utilized, more specific machine learning models when available, and general machine learning models at other times.

The generator encoder 310 may encode input data having one or more tasks. In a number of embodiments, the tasks include multi-turn dialogue samples. A dialogue sample may include a single statement (e.g. context) and a response to that statement such that a multi-turn dialogue includes two or more turns. In many embodiments, during turn i, the generator encoder 310 may map a conversation context $$x_t = (x_i^1, x_i^2, \ldots, x_i^{J_i})$$

having sequence length $J_i$ into a sequence of hidden state vectors $$\{e_i^j\}_{j=1}^{J_i}$$

according to $$e_i^j = eRNN(E(e_i^j), e_i^{j-1}), j = 1, \ldots, J_i)$$

where E ( ) is an embedding lookup and $$E \in \mathbb{R}^{h_{dim} \times V}$$

is an embedding matrix with dimension $h_{dim}$ and vocabulary size V.

The vector representation of $x_i$ may be the $L_2$ pooling over the encoded sequence $$\{e_i^j\}_{j=1}^{J_i}$$

The $L_2$ pooling may include a square root of sums of activations within the generator encoder 310. However, any of a variety of poolings, such as max-pooling, may also be used as appropriate.

The output sequence of the generator encoder 310 may also be used as an attention memory for the generator decoder 312, thereby improving the relevance of the response generated by the generator.

The generator encoder 310 may use a unidirectional context RNN, cRNN ( ), to capture $x_i$ by combining a past dialogue context $h_{i-1}$ with the pooling of the encoded sequence as $$h_i = cRNN\left(L_2\left(\{e_i^j\}_{j=1}^{J_i}\right), h_{i-1}\right)$$

In many embodiments, the use of a single vector representation helps to simplify both training and inference procedures. However, a variety of representations, such as turn-level sequential memories and/or random access memories, may also be used as appropriate.

The generator decoder (gRNN) 312 may include a unidirectional decoder RNN with (or without) an attention memory. However, the generator decoder 312 may include one or more machine learning models as described herein. The generator decoder 312 may be initialized with the last state of the generator encoder 310. The generator decoder 312 may output a hidden state representation $g_i^j$ for each previous token $x^{j-1}$ according to $$g_i^j = gRNN(E(X^{j-1}), g_i^{j-1}, a_i^j, h_i)$$

where $a_i^j$ is the attention over the encoded sequence $$\{e_i^j\}_{j=1}^{J_i}$$

In several embodiments, the training of the generator is run in teacher forcing mode, where the ground truth output (e.g. $x=x_{i+1}$) for the training example currently being used to train the generator discriminator 312 is used rather than the output actually generated by the generator discriminator 312 in the backpropagation portion of the training. This may be contrasted with the inference mode of the generator, where the output of the generator discriminator 312 (e.g. $x=y_i$) is used. However, it should be noted that the use of teacher forcing is optional during the training phase of the generator and/or machine classifier 300.

A hidden state of the generator decoder 312 $g_i^j$ may be mapped to a probability distribution through a logistic layer $\sigma(\ )$, yielding $$p_{\theta_G}(y_i | X^{1:j-1}, x_i) = softmax(\sigma(g_i^j)/\tau)$$

where $\tau$ is a hyperparameter, $\sigma(g_i^j)=E \cdot g_i^j + b_g$, and $b_g \in \mathbb{R}^{1 \times V}$ is the logit bias. In a variety of embodiments, the output projection matrix is the same as the embedding matrix.

The generative model $p_{\theta_G}$ may be derived as $$p_{\theta_G}(y_i | x_i) = p_\theta(y_i^1 | x_i) \prod_{j=2}^{T_i} p_{\theta_G}(y_i^j | X^{1:j-1}, x_i)$$

The generator cost function 314 may be used to determine the generator output based on the generative model generated by the generator decoder 312. In many embodiments, the generator cost function 314 includes a maximum likelihood estimator. In several embodiments, the generator cost function 314 is weighted based on the output from the discriminator cost function 326 and/or similarity function 324. In a number of embodiments, the generator cost function 314 $\nabla_{\theta_G}$ is defined as $$\nabla_{\theta_G} \frac{1}{m} \sum_{i=1}^{m} \left[ \log\left(P_{\theta_{G_T}}(x_r^{(i)} | x_c^{(i)})\right) \right] +$$

$$D_c(G_A(x_c^{(i)}, z^{(i)}), x_c^{(i)}) \log\left(P_{\theta_G}(G_A(x_c^{(i)}, z^{(i)}), x_c^{(i)})\right) \Big]$$

with elements as defined herein with respect to FIGS. 3A-B.

As shown in FIG. 3B, the discriminator may include a discriminator encoder 320, a discriminator classifier 322, a similarity function 324, and a discriminator cost function 326. In a variety of embodiments, the discriminator $$Q_{\theta_D}(y_i, x_i)$$

includes a binary classifier that takes a response sequence $y_i$ and a dialogue context $x_i$ as input. In several embodiments, the discriminator is trained using the output labels provided by the generator. The discriminator may employ a variety of machine learning models described herein, such as a RNN. The discriminator may share the hierarchical encoder and the word embeddings with the generator, with the initial state of the discriminator being the final state of the generator encoder 310. The discriminator encoder 320 encodes input data to be provided to the discriminator classifier 322 and/or similarity function 324. In several embodiments, the discriminator encoder 320 corresponds to the generator encoder 310; that is, the discriminator encoder 320 and generator encoder 310 are the same. In many embodiments, the discriminator encoder 320 encodes some or all of the input data as described with respect to generator encoder 310.

The discriminator classifier 322 may estimate an action-value function Q, also known as a dialogue context-response function, for a particular input sequence. The Q value may be calculated at an utterance level and/or at a word level. The Q value may be calculated using the last output of the discriminator classifier 322. In several embodiments, the Q value at the utterance level may be calculated as:

$$Q\theta_D(y_i, x_i) = sigmoid(\sigma(d_i^{T_i}))$$

where $$\sigma(d_i^{T_i}) = W_d \cdot hg_i^j + b_d,$$

$$W_d \in \mathbb{R}^{h_{dim} \times V}$$

is the logit projection, and $$B_g \in \mathbb{R}^{1 \times V}$$

is the bias.

At the word level, the discriminator classifier 322 produces a word-level evaluation. The normalized Q value and the adversarial bootstrapping objective function may be defined as:

$$d_i^j = Q_{\theta_D}(y_i^j, x_i | y_i) = sigmoid(\sigma(d_i^j))$$

and $$\mathcal{L}_{AB}(\theta_G) = - \sum_{y_i \in y_i} \sum_{j=1}^{T_i} t_G(y_i^j) \log p_{\theta_G}(y_i^j | x_i)$$

where $$t_G(y_i^j) = \begin{cases} \beta & y_i^j = x_{i+1}^j \\ 0 & y_i^j = \operatorname*{argmax}_{y_i^j} p_{\theta_G}(y_i^j | X^{1:j-1}, x_i) \\ (1-\beta)d_i^j & \text{otherwise} \end{cases}$$

The output of the discriminator classifier 322 may be provided to a logistic layer and sigmoid function, such as similarity function 324 and/or discriminator cost function 326 to produce a normalized Q (action-value function) value of the pair of dialogue context (state) and response (action). This differs from existing machine classifiers that may only determine if a context-response pair is human-generated or machine-generated. In several embodiments, the discriminator cost function 326 includes a metric learner. Accordingly, the training of the machine classifier may be viewed as joint metric and maximum likelihood learning.

The similarity function 324 may determine how similar the generator output is to the discriminator output. Similarity learning is closely related to distance metric learning. Metric learning is the task of learning a distance function over objects. A metric or distance function has to obey four axioms: non-negativity, identity of indiscernibles, symmetry and subadditivity (or the triangle inequality). In practice, metric learning algorithms ignore the condition of identity of indiscernibles and learn a pseudo-metric. Any of a variety of similarity functions including, but not limited to, regression similarity functions, classification similarity functions, ranking similarity functions, and hashing similarity functions, may be used as appropriate.

The discriminator cost function 326 may be used to determine the discriminator output based on the model generated by the discriminator classifier 322. In many embodiments, the discriminator cost function 326 includes a metric learner. In several embodiments, the discriminator cost function 326 is weighted based on the output from the generator cost function 326 and/or similarity function 324. In a number of embodiments, the discriminator cost function 326 $\nabla_{\theta_D}$ is defined as $$\nabla_{\theta_D} \frac{1}{m} \sum_{i=1}^{m} [\log D_c(x_r^{(i)}, x_c^{(i)}) +$$

$$\log(1 - D_c(G_T(x_\varepsilon^{(i)}), x_c^{(i)})) + \log(1 - D_c(x_w^{(i)}, x_c^{(i)})) +$$

$$S(D_e(x_r^{(i)}, x_c^{(i)}), D_e(G_A(x_c^{(i)}, z^{(i)}), x_c^{(i)}))\log D_c(G_A(x_c^{(i)}, z^{(i)}), x_c^{(i)}) +$$

$$(1 - S(D_e(x_r^{(i)}, x_c^{(i)}), D_e(G_A(x_c^{(i)}, z^{(i)}), x_c^{(i)})))\log(1 - D_c(G_A(x_\varepsilon^{(i)}, z^{(i)}), x_c^{(i)}))]$$

Figure 4:
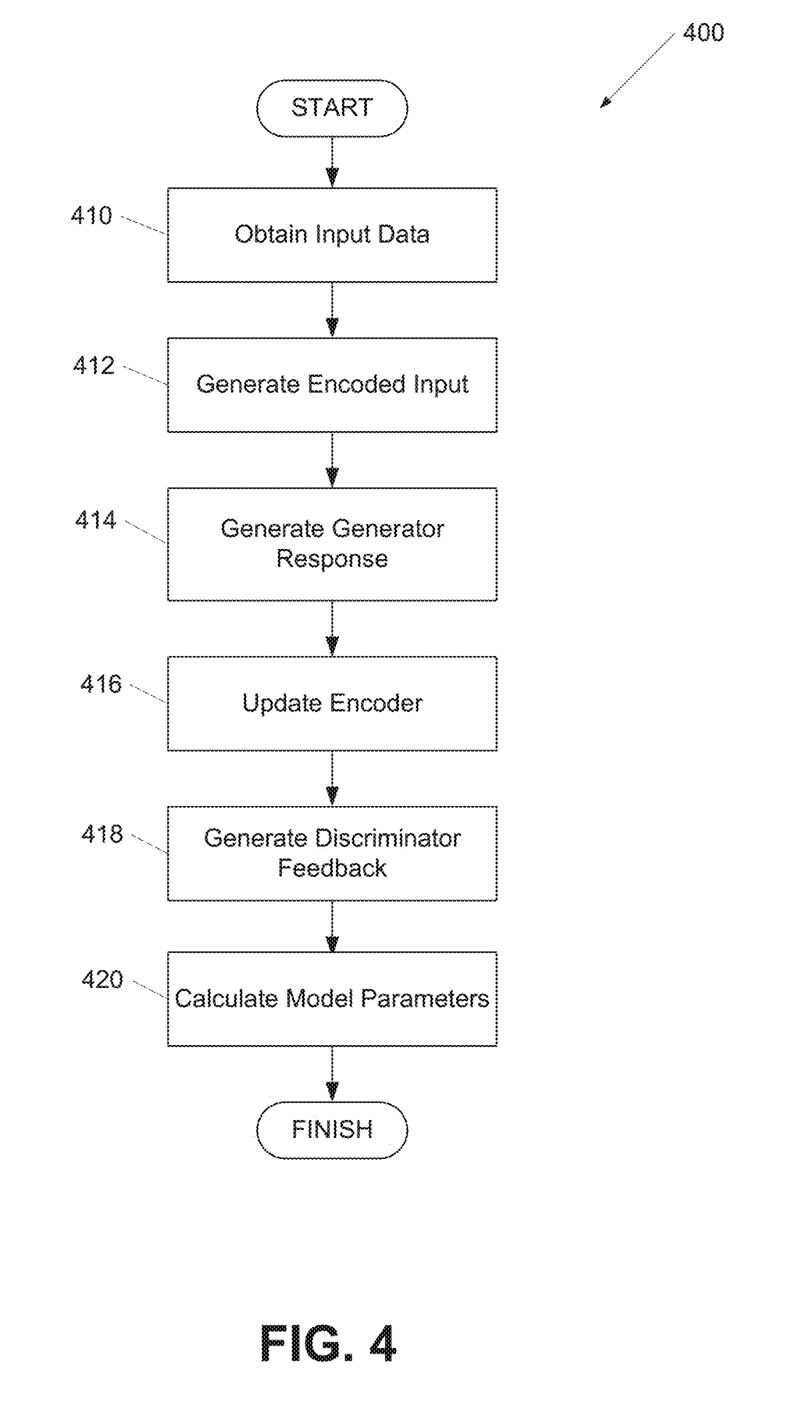
FIG. 4 shows a flow chart of a process for training a machine classifier according to one or more aspects of the disclosure.

FIG. 4 shows a flow chart of a process for training a machine classifier according to one or more aspects of the disclosure. Some or all of the steps of process 400 may be performed using one or more computing devices as described herein. In a variety of embodiments, some or all of the steps described below may be combined and/or divided into sub-steps as appropriate.

When training a machine classifier, the generator and discriminator may be trained simultaneously and/or separately. In many embodiments, the generator is trained with two samples and the discriminator is trained with three samples. In a variety of embodiments, teacher forcing outputs (e.g. ground truth labels) from the generator are used to train the discriminator. The encoder parameters may be included with the generator output. In several embodiments, the generator encoder is not updated during the training of the discriminator. The generator and discriminator may employ a variety of cells and/or hidden state sizes, such as 3-layer GRU cells and a hidden state size of 512. The word embedding size may be defined to be any value, and in a number of embodiments is set to the hidden state size. The vocabulary size may be set to any appropriate value for a target language and/or task, such as 50,000. Other hyperparameters may include $\beta=1$, $\alpha=1$, $top_k=10$, and/or $\tau=1$. For training, the initial learning rate may be 0.5 with decay rate factor of 0:99, applied when the generator loss has increased over two iterations. A batch size of 64 may be used and clip gradients may be approximately 5.0. However, it should be noted that any parameter may be set to any value as appropriate. Parameters may be initialized with Xavier uniform random initialization. A variety of softmax functions, such as full softmax and sampled softmax, may be used based on processing and/or memory concerns for a particular computing device. In particular, it should be noted that different softmax functions may be used in training and inference. The machine classifier may be trained end-to-end using a stochastic gradient descent algorithm.

At step 410, input data may be obtained. The input data may include one or more training examples for one or more tasks. In several embodiments, the input data includes one or more turns of a multi-turn dialog example. Each turn may include a context and a response. Each turn may be independent and/or dependent on one or more previous turns within the multi-turn dialog example.

At step 412, encoded input data can be generated. In many embodiments, the encoded input data includes one or more word embeddings generated based on the input data. The word embeddings may be generated for each training example in the input data. In several embodiments, the word embeddings are generated using a variety of techniques, such as those described with respect to FIGS. 3A-B.

At step 414, a generator response may be generated. The generator response may be generated during the training of the generator. Training the generator may include determining an output based on the word embeddings as described with respect to FIG. 3A. In several embodiments, the output of the generator is determined using a maximum likelihood estimation objective. In many embodiments, training the generator includes updating one or more weights of a cost function used to determine the generator output based one or more candidate outputs generated based on the word embeddings.

At step 416, an encoder may be updated. The encoder may be updated based on the output of the generator (e.g. the generator response). In a variety of embodiments, updating the encoder includes updating one or more weights of a cost function used to determine the word embeddings based on the input data. In several embodiments, the weights of the encoder are updated during an autoregression phase of the training of the generator.

At step 418, discriminator feedback may be generated. In several embodiments, the discriminator may be trained based on the discriminator feedback and/or generator response. Training the discriminator may include determining an output based on the word embeddings and the generator output as described with respect to FIG. 3B. In several embodiments, the output of the discriminator is determined using a metric learning objective. In many embodiments, training the discriminator includes updating one or more weights of a cost function used to determine the discriminator output based one or more candidate outputs generated based on the word embeddings and the generator output.

At step 420, model parameters may be calculated. In a variety of embodiments, the model parameters include output weights for determining an output based on the generator response and discriminator feedback for a particular input. The output weights may be used in a combined maximum likelihood estimation objective and metric learning objective to determine an output from the machine classifier for a particular word embedding. In several embodiments, the output weights are based on the metric learning objective and are used as an input to the maximum likelihood estimation objective. The output weights may be calculated based on an autoregressive function determined based on the training of the generator and/or discriminator.

Figure 5:
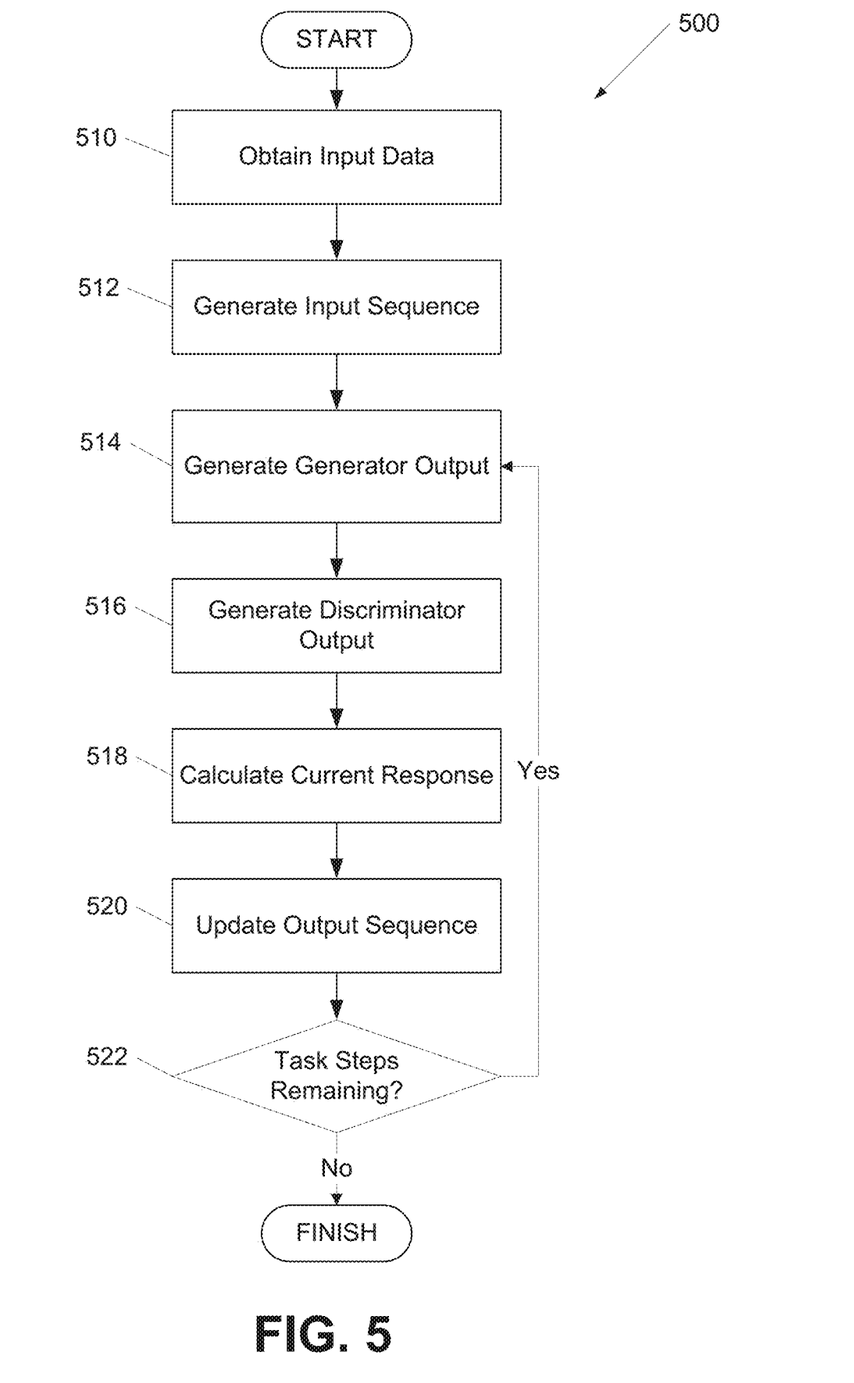
FIG. 5 shows a flow chart of a process for classifying data according to one or more aspects of the disclosure.

FIG. 5 shows a flow chart of a process for classifying data according to one or more aspects of the disclosure. Some or all of the steps of process 500 may be performed using one or more computing devices as described herein. In a variety of embodiments, some or all of the steps described below may be combined and/or divided into sub-steps as appropriate.

At step 510, input data may be obtained. The input data may include one or more training examples for one or more tasks. In several embodiments, the input data includes one or more turns of a multi-turn dialog example. Each turn may include a context and a response. Each turn may be independent and/or dependent on one or more previous turns within the multi-turn dialog example.

At step 512, an input sequence may be generated. The input sequence may include one or more word embeddings are described herein. In a variety of embodiments, the input sequence includes one or more turns of a multi-turn dialogue.

At step 514, a generator output may be generated. The generator output may include a response to a context as described herein. In a variety of embodiments, the context is a context in a multi-turn dialog and the response is to the context. The generator output may be generated as described herein, particularly with respect to FIG. 3A.

At step 516, a discriminator output may be generated. The discriminator output may indicate if the generator output is generated from a human, a machine, and/or normalized Q (action-value function) value as described herein. The discriminator output may be generated as described herein, particularly with respect to FIG. 3B.

At step 518, a current response may be calculated. The current response may be determined based on the generator output and/or the discriminator output. In a variety of embodiments, the current response is based on a joint maximum likelihood estimation objective and metric learning objective as described herein.

At step 520, an output sequence may be updated. The output sequence may be updated by appending the current response to the output sequence. In a variety of embodiments, the output sequence may be updated by adding the context corresponding to the corresponding response to the output sequence. In many embodiments, the output sequence includes a multi-turn dialog with contexts provided in the obtained input data and responses generated by the machine classifier.

At step 522, remaining task steps may be determined. If additional steps remain in the task, process 500 may return to step 514 and the next step in the task may be processed by the machine classifier. If no additional steps remain, the generated output sequence may be returned and process 500 ends. For example, in a multi-turn dialogue, the output sequence may include one or more responses to a question provided by a human user.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computing device, comprising:
one or more processors; and
memory storing instructions that, when executed by the one or more processors, cause the computing device to:
  initialize a machine classifier having a deep neural network architecture for multi-turn dialogue generation;
  generate, based on input data comprising a multi-turn dialogue data set, an input sequence comprising one or more turns of a multi-turn dialogue;
  generate, by a generator of the machine classifier and based on the input sequence, a generator output comprising a response to a dialogue context in the multi-turn dialogue;
  generate, by a discriminator of the machine classifier and for the input sequence, a discriminator model indicating an estimated function value of a pair comprising the dialogue context and the response, wherein the estimated function value is calculated at an utterance level and a word level of the input sequence;
  generate, by a discriminator cost function and based on the discriminator model, a discriminator output indicating a normalized function value of the estimated function value, wherein the normalized function value is calculated using a last response of the multi-turn dialogue;
  determine, based on the generator output and the discriminator output, a current response;
  update an output sequence by appending the current response to the output sequence; and
  generate, based on the updated output sequence and based on the normalized function value, one or more responses to the multi-turn dialogue.

2. The computing device of claim 1, wherein the estimated function value is associated with an action-value function of the pair comprising the dialogue context and the response.

3. The computing device of claim 1, wherein the instructions, when executed by the one or more processors, further cause the computing device to generate the discriminator output indicating whether the pair comprising the dialogue context and the response is human-generated or machine-generated.

4. The computing device of claim 1, wherein the instructions, when executed by the one or more processors, further cause the computing device to:
train, based on a plurality of examples, the machine classifier to generate candidate responses for multi-turn dialogue, wherein the plurality of examples comprises a plurality of dialogue sequences, and wherein training the machine classifier using the plurality of examples comprises:
  generating, by the generator of the machine classifier, the generator output based on an encoded input of the plurality of examples;
  providing, as input data to the discriminator of the machine classifier, a combination of ground truth labels, the generator output, and negative examples, wherein the negative examples comprise unrelated dialogue samples from the plurality of examples having two or more turns, and each turn is independent from one or more previous turns;

generating, by the discriminator, the discriminator output based on the input data to the discriminator; and updating a plurality of machine classifier parameters based on a first weight determined based on the discriminator output and a second weight determined based on the generated output.

5. The computing device of claim 4, wherein the deep neural network architecture comprises an encoder, the generator, the discriminator, and an output layer, wherein the instructions, when executed by the one or more processors, further cause the computing device to:

generate, by the encoder, the encoded input based on the plurality of examples; and generate, by the output layer and using the trained machine classifier, one or more class labels based on the input data set comprising the multi-turn dialogue.

6. The computing device of claim 4, wherein the encoded input comprises a single vector representation of an example.

7. The computing device of claim 1, wherein the instructions, when executed by the one or more processors, further cause the computing device to determine the current response based on a joint maximum likelihood estimation objective and a metric learning objective.

8. The computing device of claim 1, wherein the instructions, when executed by the one or more processors, further cause the computing device to generate the discriminator output based on a ground truth label associated with encoded input data and at least one previous output generated by the generator based on the encoded input data.

9. The computing device of claim 1, wherein the instructions, when executed by the one or more processors, further cause the computing device to generate the generator output by:

using the discriminator output to weight a cross-entropy loss for each of a set of candidate responses generated by the generator, and selecting, from the set of candidate responses, a candidate response with a lowest loss as the generator output.

10. The computing device of claim 1, wherein the discriminator comprises a metric encoder.

11. The computing device of claim 1, wherein the generator comprises a maximum likelihood estimator classifier.

12. The computing device of claim 1, wherein the deep neural network architecture comprises a feed-forward neural network, convolutional neural network, and a recurrent neural network.

13. A method, comprising:

initializing a machine classifier having a deep neural network architecture for multi-turn dialogue generation;

generating, based on input data comprising a multi-turn dialogue data set, an input sequence comprising one or more turns of a multi-turn dialogue;

generating, by a generator of the machine classifier and based on the input sequence, a generator output comprising a response to a dialogue context in the multi-turn dialogue;

generating, by a discriminator of the machine classifier and for the input sequence, a discriminator model indicating an estimated function value associated with a pair comprising the dialogue context and the response, wherein the estimated function value is calculated at an utterance level and a word level of the input sequence;

generating, by a discriminator cost function and based on the discriminator model, a discriminator output indicating a normalized function value of the estimated function value, wherein the normalized function value is calculated using a last response of the multi-turn dialogue;

determining, based on the generator output and the discriminator output, a current response;

updating an output sequence by appending the current response to the output sequence; and generating, based on the updated output sequence and based on the normalized function value, one or more responses to the multi-turn dialogue.

14. The method of claim 13, wherein the estimated function value is associated with an action-value function of the pair comprising the dialogue context and the response.

15. The method of claim 13, wherein generating the discriminator output further comprises generating the discriminator output indicating whether the pair comprising the dialogue context and the response is human-generated or machine-generated.

16. The method of claim 13, further comprising:

training, based on a plurality of examples, the machine classifier to generate candidate responses for multi-turn dialogue, wherein the plurality of examples comprises a plurality of dialogue sequences, and wherein training the machine classifier using the plurality of examples comprises:

generating, by the generator of the machine classifier, the generator output based on an encoded input of the plurality of examples;

providing, as input data to the discriminator of the machine classifier, a combination of ground truth labels, the generator output, and negative examples, wherein the negative examples comprise unrelated dialogue samples from the plurality of examples having two or more turns, and each turn is independent from one or more previous turns;

generating, by the discriminator, the discriminator output based on the input data to the discriminator; and updating a plurality of machine classifier parameters based on a first weight determined based on the discriminator output and a second weight determined based on the generated output.

17. The method of claim 16, wherein the deep neural network architecture comprises an encoder, the generator, the discriminator, and an output layer, wherein the method further comprises:

generating, by the encoder, the encoded input based on the plurality of examples; and generating, by the output layer and using the trained machine classifier, one or more class labels based on the input data set comprising the multi-turn dialogue.

18. A non-transitory machine-readable medium storing instructions that, when executed by one or more processors, cause the one or more processors to perform steps comprising:

initializing a machine classifier having a deep neural network architecture for multi-turn dialogue generation;

generating, based on input data comprising a multi-turn dialogue data set, an input sequence comprising one or more turns of a multi-turn dialogue;

generating, by a generator of the machine classifier and based on the input sequence, a generator output comprising a response to a dialogue context in the multi-turn dialogue;

generating, by a discriminator of the machine classifier and for the input sequence, a discriminator model indicating an estimated function value associated with a pair comprising the dialogue context and the response, wherein the estimated function value is calculated at an utterance level and a word level of the input sequence, generating, by a discriminator cost function and based on the discriminator model, a discriminator output indicating a normalized function value of the estimated function value, wherein the normalized function value is calculated using a last response of the multi-turn dialogue;

determining, based on the generator output and the discriminator output, a current response;

updating an output sequence by appending the current response to the output sequence; and generating, based on the updated output sequence and based on the normalized function value, one or more responses to the multi-turn dialogue.

19. The non-transitory machine-readable medium of claim 18, wherein the estimated function value is associated with an action-value function of the pair comprising the dialogue context and the response.

20. The non-transitory machine-readable medium of claim 18, wherein the instructions, when executed by the one or more processors, further cause the one or more processors to perform steps comprising:

training, based on a plurality of examples, the machine classifier to generate candidate responses for multi-turn dialogue, wherein the plurality of examples comprises a plurality of dialogue sequences, and wherein training the machine classifier using the plurality of examples comprises:

generating, by the generator of the machine classifier, the generator output based on an encoded input of the plurality of examples;

providing, as input data to the discriminator of the machine classifier, a combination of ground truth labels, the generator output, and negative examples, wherein the negative examples comprise unrelated dialogue samples from the plurality of examples having two or more turns, and each turn is independent from one or more previous turns;

generating, by the discriminator, the discriminator output based on the input data to the discriminator; and updating a plurality of machine classifier parameters based on a first weight determined based on the discriminator output and a second weight determined based on the generated output.

* * * * *